(No Model.)
H. C. WHITE.
STEREOSCOPE.
No. 401,807. Patented Apr. 23, 1889.
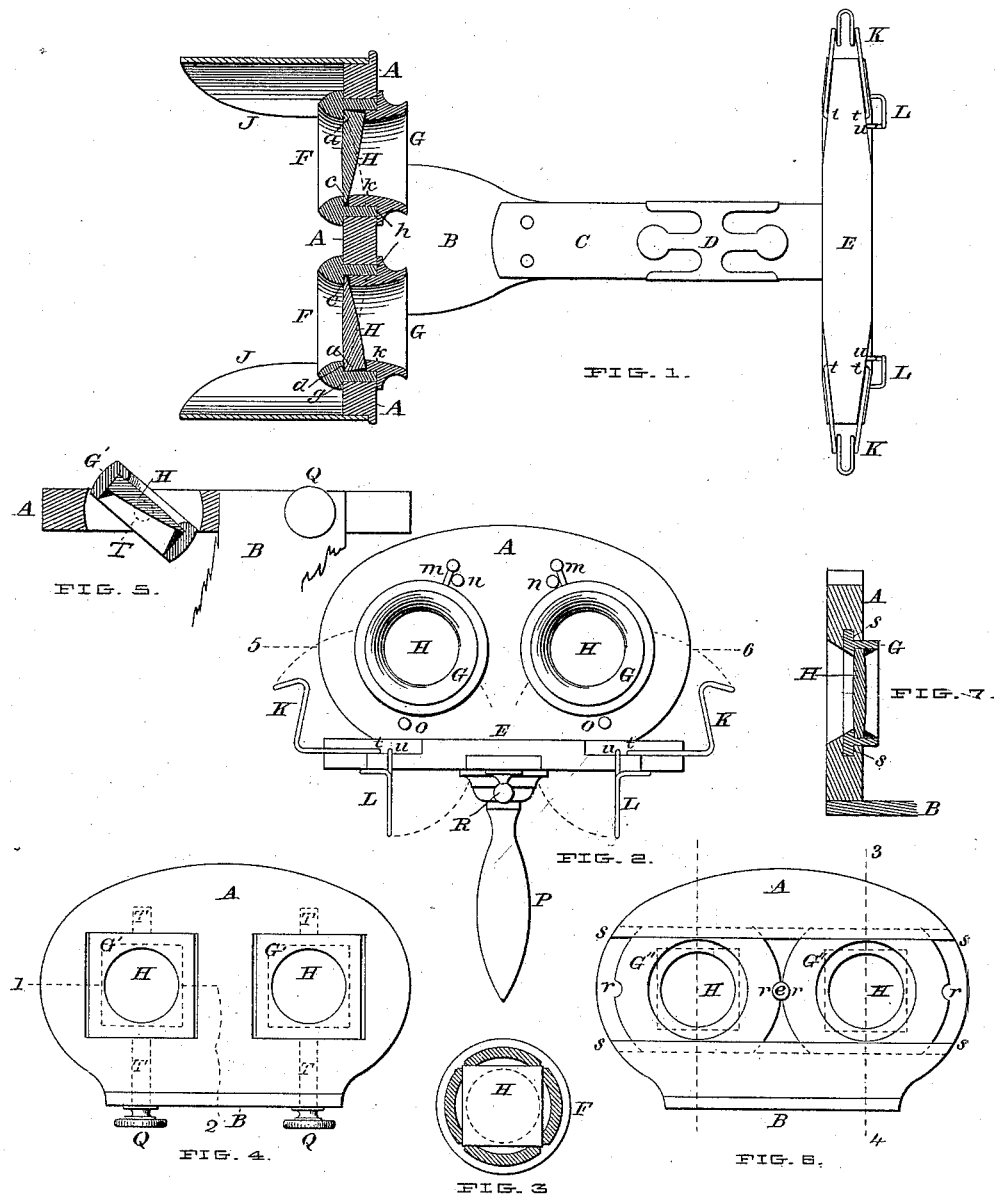
WITNESSES:
J. M. A. Cloward
James H. Walbridge
INVENTOR:
HAWLEY C. WHITE,
by Franklin Scott, Atty.

UNITED STATES PATENT OFFICE.

HAWLEY C. WHITE, OF NORTH BENNINGTON, VERMONT.

STEREOSCOPE.

SPECIFICATION forming part of Letters Patent No. 401,807, dated April 23, 1889.

Application filed December 17, 1888. Serial No. 293,806. (No model.)

*To all whom it may concern:*

Be it known that I, HAWLEY C. WHITE, of North Bennington, in the State of Vermont, have invented certain Improvements in Stereoscopes, of which the following description, in connection with the accompanying sheet of drawings, constitutes a specification.

As stereoscopes have formerly been made, the lenses have been set in rigid immovable frames or holders, and for that reason such lenses were unavailable for any but stereoscopic uses. This invention appertains to the setting of such lenses in separate rotatable, reversible, or interchangeable frames, so mounted or adjusted in a lens-holder that the position of the thick and thin or the central and peripheral edges of each lens may be inverted or transposed, to the end that when the central or thick edges are turned outwardly the adjustment shall produce the true stereoscopic effect; but when their relative positions are reversed, so that the peripheral or thin edges of the lenses shall be turned outwardly, the two lenses shall, to all intents and purposes, form sections of a single double-convex lens, substantially like those used in the single-lens graphoscope for viewing single prints or pictures.

This improved optical instrument has provisions for viewing stereographs through stereoscopic lenses of the ordinary kind, and also provisions for inverting the same lenses, whereby the instrument is transmuted from a stereoscope into a graphoscope, and after such conversion ordinary single prints or views may be examined with the most satisfactory results. The view-holder has appliances, as hereinafter pointed out, for supporting both stereoscopic and other views.
Reference is herein made to the annexed drawings for a better elucidation of the invention, wherein I have shown in Fig. 1 a plan of the same with the top half of the hood removed, the section being taken on line 5 6 of Fig. 2. Fig. 2 is a view of that end of the stereoscope opposite the lens-frame. Fig. 3 is a detail of a part of the lens-frame, showing the setting of the lens. Fig. 4 is a front elevation of a form of lens-holder having provisions for revolving each lens independently about a vertical axis. Fig. 5 shows an edge view of the lens-holder, as seen from the bottom, one lens-frame being shown in transverse section taken on line 1 2 of Fig. 4. Fig. 6 is a front elevation of another style of lens-holder, showing means for effecting conversion from a stereoscope to a graphoscope by transposition of the separate lens-holders. Fig. 7 is a vertical transverse section from Fig. 6, taken on the line 3 4.

The frame of my apparatus consists of a lens-holder, A, attached to one end of a shaft, B. On the shaft B is mounted the sliding piece C, which slips back and forth under the spring-clamp D, which is attached to the shaft B underneath. Slide C carries the view-holder E, which is provided with the folding supporting-wires K K for stereoscopic views and similar wires, L L, for supporting single views, like cabinet-size photographs, in an upright central position. Wires L L swing below bar E, so as to bring the central parts of the picture within range of the axes of the two lenses. The slide C may be moved along shaft B by means of a small knob, R, attached thereto, Fig. 2, for that purpose.

The eye-pieces, Fig. 1, which contain the lenses, consist each of the two annular pieces F and G, united as shown. Piece F is shouldered down, so as to enter a circular hole in the lens-holder A and turn therein. The internal annular shoulder, $d$, forms a ledge, which supports the back side of the lens H. The annulus G is turned up with a shoulder, $h$, and a tubular projection, $k$, which closely fits the interior of annulus F, and its internal end is beveled to fit and bear against the outer surface of lens H. When the two rings F and G are put together in the holder A, as shown, they are glued or otherwise suitably united or fastened to each other, so as firmly to confine the lens and at the same time permit the complete eye-piece to be turned or rotated within its seating in holder A. Near the periphery of each lens-frame or eye-piece are inserted in the lens-holder A two pins, $n$ and $o$, and the radial pin $m$ is inserted in the edge of annulus G as a provision to facilitate rotation. When pin $m$ is rotated around against stop $n$, the lens is set for stereoscopic use, and when against stop $o$ for graphoscopic purposes. The pin-stops $n$ and $o$ are fixed so as to admit of an exact semi-revolution of the lens.

The provisions for revolving the lenses shown in Figs. 4 and 5 consist in mounting the lens H in a small frame or eye-piece, G', which in all essentials is a substitute or a mechanical equivalent for the rings F G of Fig. 1 upon spindles or journals T T. The lens-holder A is mortised or perforated to receive such eye-pieces, and bearings for journals T T are provided in the holder A, as shown. The lower end of journal T is provided with a knurled head or thumb-piece, Q, for turning the same. One of the lenses is shown partially rotated in Fig. 5. These lenses are set either for natural or stereoscopic uses by simply rotating them on their bearings T T until the desired position of the lenses is secured.

In the two cases just described change of position of the lens is accomplished by revolution of the lens about an axis passing through the individual eye-piece or frame; but the same results may be reached by transposing the right lens to the left position, and vice versa. To do this an apparatus like, or substantially like, that shown in Fig. 6 may be employed. In this the two lenses are set in separate slides, G'' G'', which are fitted to slide in grooves or ways s s, Fig. 7, in the holder A. They are counterparts of each other and are transposable. The holder A has a central pin, e, projecting from the center of the same, which serves as a stop. The edges of the slides are nicked at r r on opposite sides, and when pushed into position are pressed up against the pin e. To convert the instrument from a common or natural lenticularscope to a stereoscope, or vice versa, it is only necessary to pull out the slides and insert them from the opposite edge of the holder, preserving, however, their proper unchanged vertical position.

In all these various modifications, and probably others not shown, the common characteristic appearing in them all is a capacity of transmuting one instrument into the other by transposing or revolving one and the same pair of lenses in the manner pointed out.

Instruments have long been in use wherein provisions exist for substituting a single lens for a pair of stereoscopic semi-lenses by withdrawal of one and the insertion of the other; but I make no claim to any such device, as they differ materially from this invention.

In the following claims, where the term "reversing," "reversible," or any of the derivatives from the verb "reverse" occurs, I design and intend to use such term or terms as including and covering all terms implying transposition; therefore

I claim as my invention—

1. A stereoscope provided with a pair of stereoscopic lenses, each of which is mounted in an anular eye-piece which is fitted to and adapted to revolve in a circular opening in the lens-holder about an axis coincident with the axis of the eye of the observer, substantially as described, and for the purposes set forth.

2. The combination of lens-holder A and lenses H H, mounted in revoluble annular eye-pieces F G F G, with guiding-pins n o n o, and adjusting-pins m m, substantially as described, and for the purposes set forth.

3. The combination of the lens-holder A, provided with the two reversible stereoscopic lenses H H, mounted on the longitudinally-adjustable shaft B C, with the view-holder E, provided with the supports K K and L L, for supporting either a stereoscopic or a single view, substantially as described and set forth.

In testimony whereof I have hereto subscribed my name, at North Bennington, Vermont, this 8th day of December, 1888.

HAWLEY C. WHITE.

In presence of—
FRANKLIN SCOTT,
J. M. A. CLOWARD.